(12) United States Patent
Matsushima et al.

(10) Patent No.: US 7,254,729 B2
(45) Date of Patent: Aug. 7, 2007

(54) PROCESSING SYSTEM AND MEMORY MODULE HAVING FREQUENCY SELECTIVE MEMORY

(75) Inventors: Shinji Matsushima, Yokohama (JP); Reiko Ohtani, Kawasaki (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 281 days.

(21) Appl. No.: 10/853,512

(22) Filed: May 25, 2004

(65) Prior Publication Data

US 2005/0028016 A1 Feb. 3, 2005

(30) Foreign Application Priority Data

May 27, 2003 (JP) ............... 2003-148751

(51) Int. Cl.
- G06F 1/00 (2006.01)
- G06F 1/12 (2006.01)
- G06F 13/42 (2006.01)
- G06F 1/04 (2006.01)

(52) U.S. Cl. ............ 713/322; 713/400; 713/500; 713/501; 713/502; 713/600; 713/601

(58) Field of Classification Search ......... 713/322, 713/400, 500, 501, 502, 600, 601
See application file for complete search history.

(56) References Cited

U.S. PATENT DOCUMENTS

| | | | |
|---|---|---|---|
| 6,047,344 A * | 4/2000 | Kawasumi et al. | 710/107 |
| 6,434,062 B2 * | 8/2002 | Lee | 365/194 |
| 7,149,909 B2 * | 12/2006 | Cui et al. | 713/322 |
| 2001/0043203 A1 * | 11/2001 | Ilnuma | 345/204 |
| 2002/0144173 A1 * | 10/2002 | Jeddeloh | 713/501 |
| 2003/0149906 A1 * | 8/2003 | Wang | 713/500 |
| 2003/0210247 A1 * | 11/2003 | Cui et al. | 345/534 |

(Continued)

FOREIGN PATENT DOCUMENTS

JP 07-020968 1/1995

(Continued)

OTHER PUBLICATIONS

"Powerplay White Paper," http://lpngsa.ibm.com/home/t/a/takemt/web/publoic/ATL.pdf, pp. 1-8.

Primary Examiner—Rehana Perveen
Assistant Examiner—Michael J. Brown
(74) Attorney, Agent, or Firm—William N. Hogg; Driggs, Hogg & Fry Co., LPA

(57) ABSTRACT

A memory module and an apparatus having a memory module for generating an internal clock synchronized to an external clock, the memory module being operated based on the internal clock as an operation clock and includes a first DLL circuit for generating a first internal clock from an external clock in a first frequency band, a second DLL circuit for generating a second internal clock from an external clock in a second frequency band different from the first frequency band, and a selector for selecting any of the first internal clock generated by the first DLL circuit and the second internal clock generated by the second DLL circuit, and outputting the selected clock as the operation clock of the memory module.

9 Claims, 5 Drawing Sheets

U.S. PATENT DOCUMENTS

2004/0000934 A1 * 1/2004 Jeon .................... 327/115

FOREIGN PATENT DOCUMENTS

| JP | 11-205129 | 7/1999 |
|----|-----------|--------|
| JP | 2000-298536 | 1/2000 |
| JP | 2000-049595 | 2/2000 |
| JP | 2001-005554 | 1/2001 |
| JP | 2001-084763 | 3/2001 |
| JP | 2001-298362 | 10/2001 |
| JP | 2002-43934 | 2/2002 |

* cited by examiner

US 7,254,729 B2

PROCESSING SYSTEM AND MEMORY MODULE HAVING FREQUENCY SELECTIVE MEMORY

BACKGROUND OF THE INVENTION

The present invention relates to an information processing apparatus and a memory module. Particularly, the present invention relates to a memory module for generating an internal clock synchronized with an external clock, the memory module being operated based on the internal clock as an operation clock, and to an information processing apparatus having the memory module.

In a notebook type personal computer of recent years, mechanisms by no means inferior to those of a desktop type personal computer, such as a processor capable of high-speed processing and a monitor displaying a sharp and clear image, have been mounted. In connection with this, power consumption required for obtaining desired performance in the notebook type personal computer has been increased, and an extension of a battery lifetime of the notebook type personal computer has become a great subject.

In order to solve such a subject as described above, a graphic processor enabling power saving by selectively using different clock frequencies has been proposed (for example, refer to Non-Patent Document 1). This graphic processor is equipped with a high performance mode operating the graphic processor at a high clock frequency when high performance is required, and with a power saving mode operating the graphic processor at a low frequency by which power saving is realized. The high performance mode and the power saving mode are switched in accordance with a switching action of a user, a switching between an AC mode and a DC mode, and the like.

[Non-Patent Document 1]
Original Internet URL (at the time of this writing) located at: http://www.ati.com/jp/technology/hardware/mobility-_fgl_7800/powerplay/

However, in the conventional graphic processor, a graphic memory cannot be operated at a frequency lower than a minimum clock frequency of a DLL circuit thereof. Therefore, the clock frequency of the graphic memory cannot be lowered, and thus it has been impossible to realize sufficient power saving of the graphic processor.

SUMMARY OF THE INVENTION

In this connection, it is a purpose of the present invention to provide an information processing apparatus and a memory module, which are capable of solving the above-described subject. This purpose is attained by the combination of features described in independent claims in the scope of claims. Moreover, dependent claims define more advantageous concrete examples of the present invention.

Specifically, an aspect of the present invention is an information processing apparatus operated based on a system clock which includes a system clock generation circuit for generating the system clock of the information processing apparatus, and a memory module for generating an internal clock synchronized with an external clock as the system clock generated by the system clock generation circuit, the memory module being operated based on the internal clock as an operation clock.

The memory module includes a first DLL circuit for generating a first internal clock from an external clock in a first frequency band and a second DLL circuit for generating a second internal clock from an external clock in a second frequency band different from the first frequency band, and a selector for selecting any of the first internal clock generated by the first DLL circuit and the second internal clock generated by the second DLL circuit, and outputting the selected clock as the operation clock of the memory module.

Moreover, according to another aspect of the present invention, the memory module includes a DLL circuit for generating an internal clock from an external clock in a predetermined frequency band and a selector for selecting any of the internal clock generated by the DLL circuit and the external clock, and outputting the selected clock as an operation clock of the memory module, and a frequency detection unit for detecting a frequency of the external clock, allowing the selector to select the internal clock generated by the DLL circuit when the detected frequency is within a range of the predetermined frequency band, and allowing the selector to select the external clock when the detected frequency is out of the range of the predetermined frequency band.

Note that the above-described summary of the invention is not one listing all features necessary for the present invention, and sub-combinations of groups of these features can also be incorporated in the invention.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described.

Figure 1:
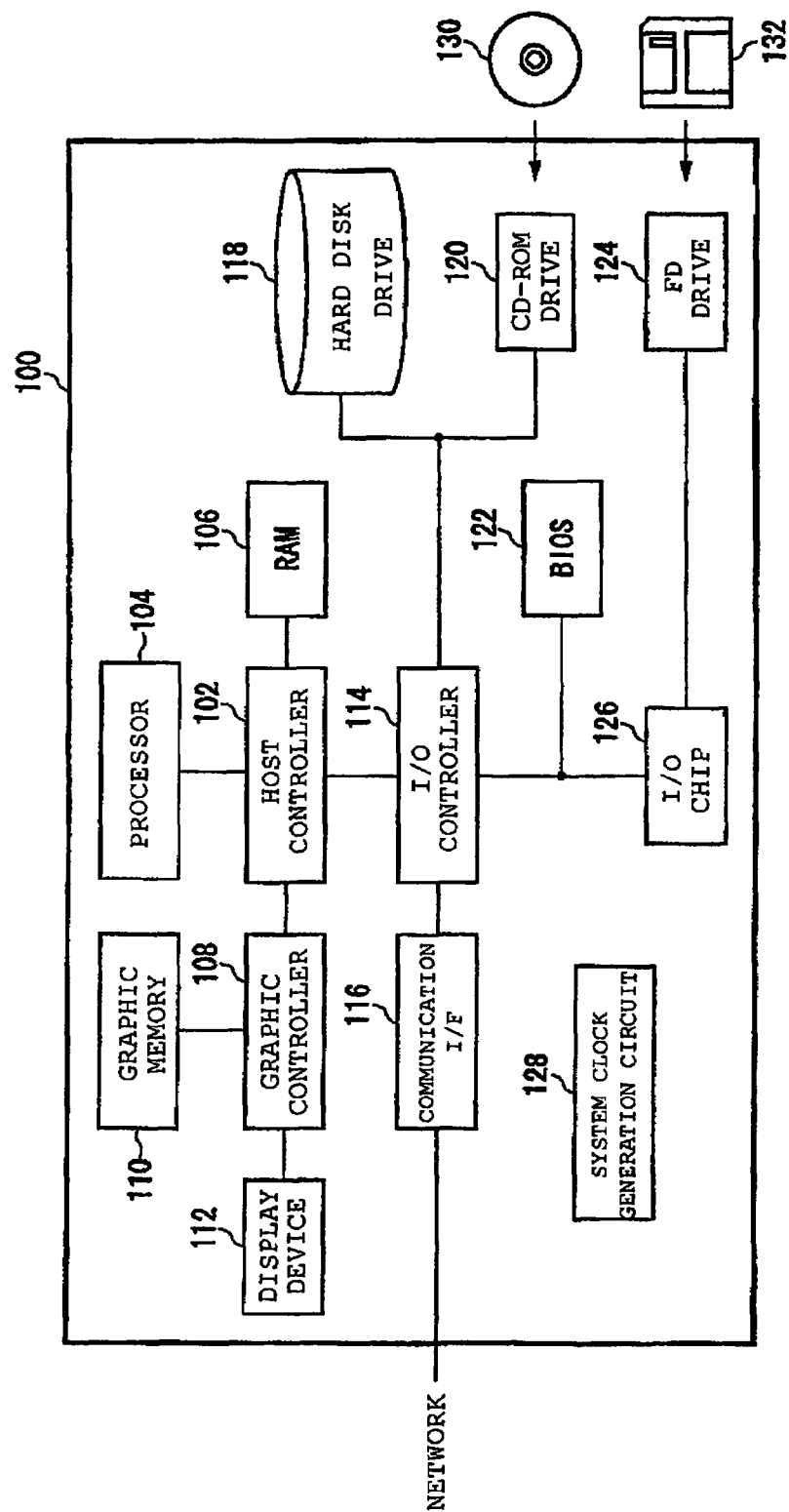
FIG. 1 is a diagram illustrating an example of a configuration of an information processing apparatus 100 according to a first embodiment.

FIG. 1 illustrates an example of a configuration of an information processing apparatus 100 according to a first embodiment of the present invention. The information processing apparatus 100 according to this embodiment includes a CPU and its periphery section having a processor 104 and a RAM 106, which are interconnected by a host controller 102, a graphic subsystem having a graphic controller 108 and a graphic memory 110, a display device 112, an input/output section having a communication interface 116, a hard disk drive 118 and a CD-ROM drive 120, which are connected to the host controller 102 by an input/output controller 114, a legacy input/output section having a BIOS 122, a flexible disk drive 124 and an input/output chip 126, which are connected to the input/output controller 114, and a system clock generation circuit 128 for generating a system clock of the information processing apparatus 100, which is supplied to the above-described constituents.

The host controller 102 connects, to the RAM 106, the processor 104 and the graphic controller 108, both of which access the RAM 106 at a high transfer rate. The processor 104 is operated based on programs stored in the BIOS 122 and the RAM 106, and controls the respective sections.

The graphic memory 110 is an example of a memory module of the present invention. The graphic memory 110 generates an internal clock synchronized with the system clock generated by the system clock generation circuit 128, and is operated based on the generated internal clock as an operation clock. The graphic controller 108 controls drawing processing of an image displayed on the display device 112. Meanwhile, based on an operation state of the graphic controller 108, the graphic controller 108 performs control for changing a frequency of the system clock supplied to the graphic memory 110 by the system clock generation circuit 128.

The input/output controller 114 connects, to the host controller 102, the communication interface 116, the hard disk drive 118 and the CD-ROM drive 120, which are relatively high-speed input/output devices. The communication interface 116 communicates with other devices through a network. The hard disk drive 118 stores a program and data for use in the information processing apparatus 100. The CD-ROM drive 120 reads a program or data from the CD-ROM 130, and provides the read program or data to the input/output chip 126 through the RAM 106.

Moreover, relatively low-speed input/output devices such as the flexible disk drive 124 and the input/output chip 126, and the BIOS 122 are connected to the input/output controller 114. The BIOS 122 stores a boot program executed by the processor 104 at the time of activation of the information processing apparatus 100, a program depending on hardware of the information processing apparatus 100 and the like. The flexible disk drive 124 reads a program or data from a flexible disk 132, and provides the read program or data to the input/output chip 126 through the RAM 106. To the information processing apparatus 100, the input/output chip 126 connects the flexible disk drive 124 and other various input/output devices through, for example, a parallel port, a serial port, a keyboard port, a mouse port and the like.

According to the information processing apparatus 100 in accordance with this embodiment, an operation state of the graphic memory 110, which indicates an operation frequency and the like, is changed in response to the operation state of the graphic controller 108, which indicates an operation frequency and a processing amount. Thus, power saving of the graphic memory 110 is realized while maintaining high performance of the graphic subsystem, and eventually, power saving of the information processing apparatus 100 such as a notebook type personal computer is realized.

Figure 2:
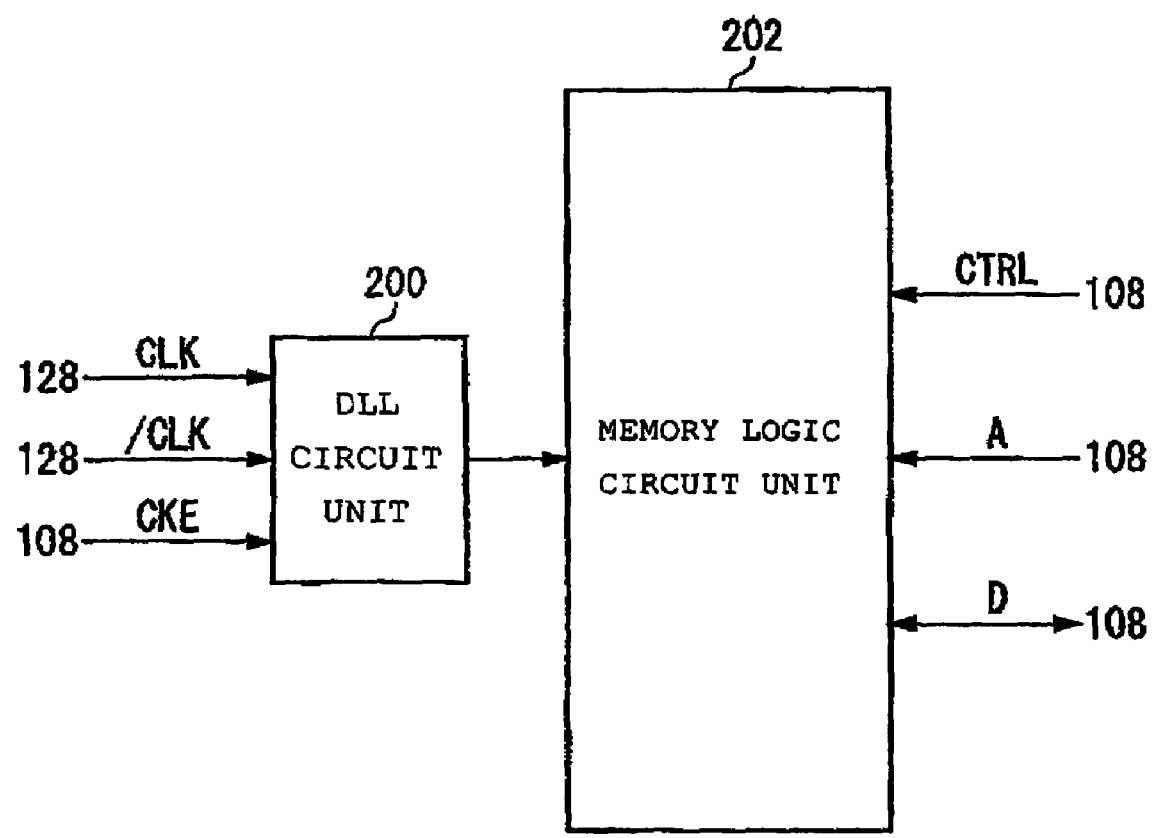
FIG. 2 is a diagram illustrating an example of a configuration of a graphic memory 110 according to the first embodiment.

FIG. 2 shows an example of a configuration of the graphic memory 110 according to this embodiment. The graphic memory 110 is, for example, a DDR-SDRAM, and has a DLL circuit unit 200 for generating an internal clock synchronized with an external clock of the graphic memory 110, and a memory logic circuit unit 202 operated based on the internal clock generated by the DLL circuit unit 200.

The DLL circuit unit 200 acquires external clocks (CLK and /CLK) as system clocks from the system clock generation circuit 128. Then, the DLL circuit unit 200 compensates jitters and the like of the external clocks to generate internal clocks, and supplies the generated internal clocks to the memory logic circuit unit 202.

Moreover, the DLL circuit unit 200 acquires a clock enable signal (CKE) from the graphic controller 108. The graphic controller 108 controls a supply of the external clocks to the graphic memory 110 by changing the clock enable signal. For example, when frequencies of the external clocks supplied to the graphic memory 110 from the system clock generation circuit 128 are changed, the graphic controller 108 changes the clock enable signal to a low level, and stops the supply of the external clocks to the DLL circuit unit 200.

The memory logic circuit unit 202 acquires the internal clocks generated by the DLL circuit unit 200. Then, the memory logic circuit unit 202 is operated based on the internal clocks as the operation clocks, and writes and reads data based on a control signal (CTRL), an address signal (A) and a data signal (D) from the graphic controller 108.

Figure 3:
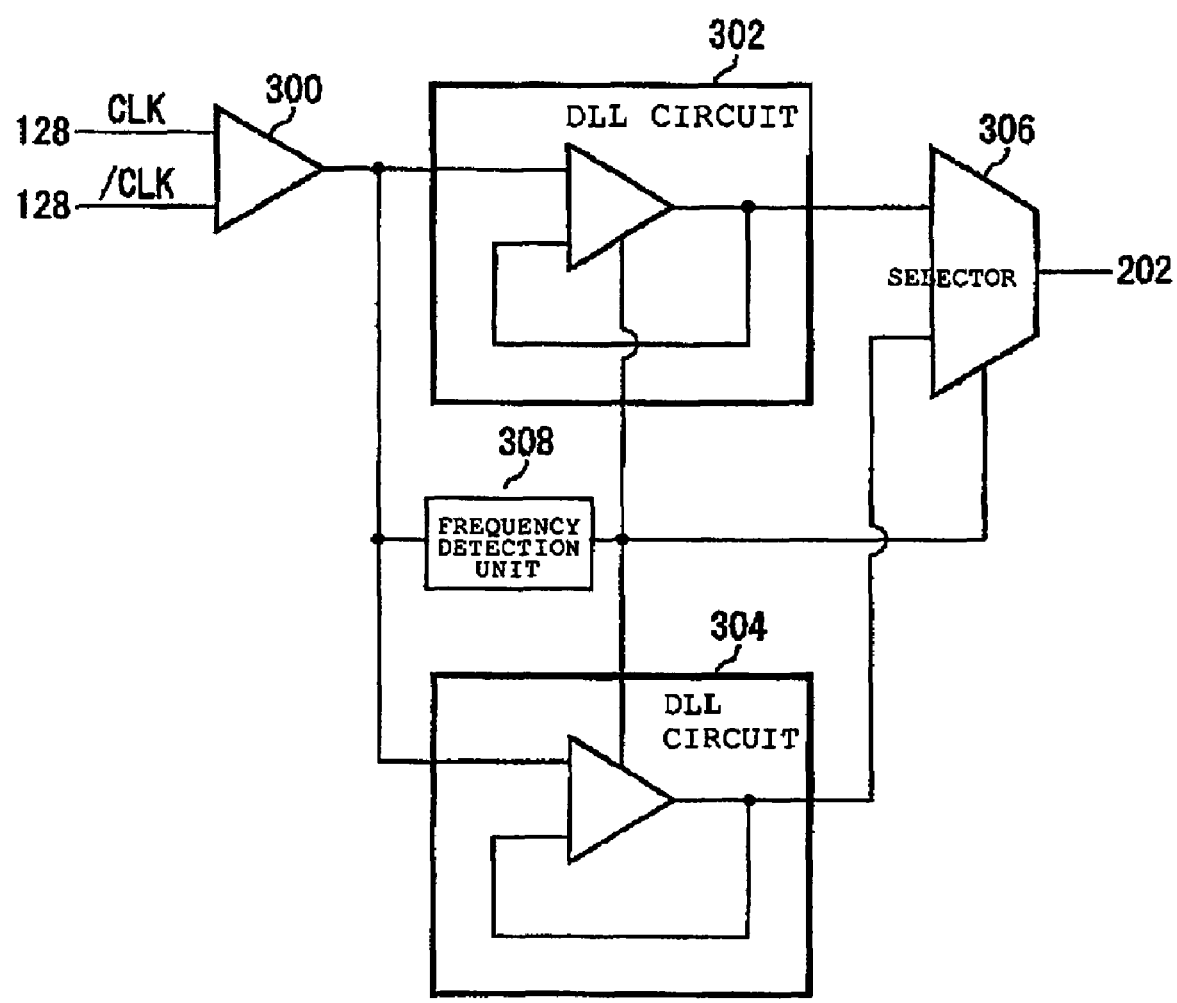
FIG. 3 is a diagram illustrating a first example of a configuration of a DLL circuit unit 200 according to the first embodiment.

FIG. 3 shows a first example of a configuration of the DLL circuit unit 200 according to this embodiment. The DLL circuit unit 200 according to this example includes a clock input buffer 300 for receiving the external clocks (CLK and /CLK) from the system clock generation circuit 128, DLL circuits 302 and 304 for generating the internal clocks from the external clocks, a selector 306 for supplying the internal clock generated by the DLL circuit 302 or 304 to the memory logic circuit unit 202, and a frequency detection unit 308 for controlling the DLL circuits 302 and 304 and the selector 306 based on the frequencies of the external clocks.

The DLL circuit 302 generates a first internal clock from an external clock in a first frequency band, which has been received by the clock input buffer 300. The DLL circuit 304 generates a second internal clock from an external clock in a second frequency band different from the first frequency band, the external clock having been received by the clock input buffer 300. For example, the DLL circuit 302 can be operated in the first frequency band as high as a range from approximately 100 MHz to approximately 200 MHz, and the DLL circuit 304 can be operated in the second frequency band as low as a range equal to or less than approximately 100 MHz. The first and second frequency bands may have an overlapped band and may be separate bands from each other.

The frequency detection unit 308 detects a frequency of an external clock received by the clock input buffer 300. Then, the frequency detection unit 308 supplies a select signal based on the detected frequency, and allows the selector 306 to select any of the first internal clock generated by the DLL circuit 302 and the second internal clock generated by the DLL circuit 304. For example, the frequency detection unit 308 allows the selector 306 to select the first internal clock generated by the DLL circuit 302 when the detected frequency is within the first frequency band, and allows the selector 306 to select the second internal clock generated by the DLL circuit 304 when the detected frequency is within the second frequency band.

Moreover, the frequency detection unit 308 supplies the DLL enable signal to the DLL circuits 302 and 304 based on the detected frequency, and then operates one of the DLL circuits 302 and 304 and stops the other. For example, when the detected frequency is within the range of first frequency band, the frequency detection unit 308 operates the DLL circuit 302 and stops an operation of the DLL circuit 304. Meanwhile, when the detected frequency is within the range of the second frequency band, the frequency detection unit 308 operates the DLL circuit 304, and stops an operation of the DLL circuit 302. The selector 306 acquires the select signal from the frequency detection unit 308, and selects any of the first internal clock generated by the DLL circuit 302 and the second internal clock generated by the DLL circuit 304 based on the select signal. Then, the selector 306 outputs the selected one of the first and second internal clocks as an operation clock of the graphic memory 110 to the memory logic circuit unit 202.

As described above, the graphic memory 110 is operated in the high frequency band by use of the DLL circuit 302 in the case of realizing high performance of the graphic memory 110, and the graphic memory 110 is operated in the low frequency band by use of the DLL circuit 304 in the case of reducing power consumption of the graphic memory 110. Furthermore, the power saving of the graphic memory 110 can be realized by stopping the operation of the unused DLL circuit 302 or 304. Specifically, according to the graphic memory 110 of this embodiment, the DLL circuit for use is selected and switched based on the frequencies of the external clocks, and the operation of the unused DLL circuit is stopped. Therefore, the high performance of the graphic memory 110 and an extension of an operation time of the information processing apparatus 100 such as the notebook type personal computer by a battery can be made compatible with each other.

Note that the DLL circuit unit 200 may include three or more DLL circuits for generating internal clocks from external clocks in frequency bands different from one another. Then, the frequency detection unit 308 may allow the selector 306 to select any of the internal clocks, which is generated by any of the three or more DLL circuits, based on the frequencies of the external clocks.

Figure 4:
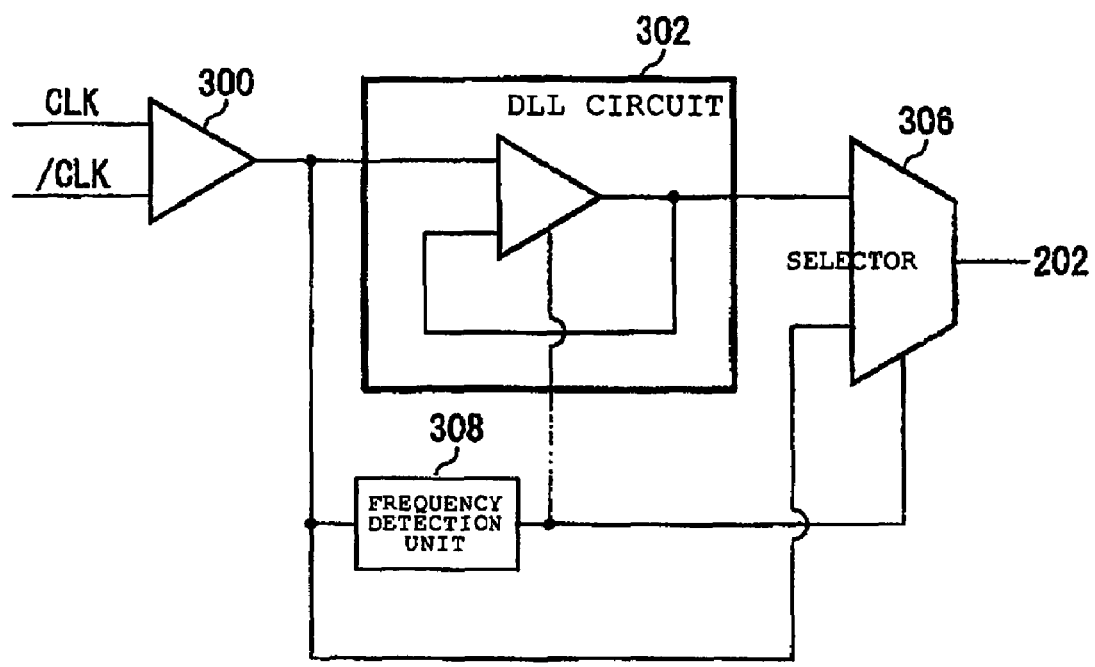
FIG. 4 is a diagram illustrating a second example of the configuration of the DLL circuit unit 200 according to the first embodiment.

FIG. 4 shows a second example of the configuration of the DLL circuit unit 200 according to this embodiment. Note that the configuration and function of the DLL circuit unit 200 according to the second example are the same as the configuration and function of the DLL circuit unit 200 according to the first example except a portion described below, and accordingly, description thereof will be omitted.

The DLL circuit unit 200 according to this example includes the clock input buffer 300, the DLL circuit 302, the selector 306 and the frequency detection unit 308. The DLL circuit 302 generates an internal clock from an external clock in a predetermined frequency band, which has been received by the clock input buffer 300.

The frequency detection unit 308 detects a frequency of the external clock received by the clock input buffer 300, supplies a select signal to the selector 306 based on the detected frequency, and allows the selector 306 to select any of the internal clock generated by the DLL circuit 302 and the external clock received by the clock input buffer 300. For example, the frequency detection unit 308 allows the selector 306 to select the internal clock generated by the DLL circuit 302 when the detected frequency is within a range of a predetermined frequency band, and allows the selector 306 to select the external clock received by the clock input buffer 300 when the detected frequency is out of the range of the predetermined frequency band. Particularly, the frequency detection unit 308 allows the selector 306 to select the external clock received by the clock input buffer 300 when the detected frequency is lower than the predetermined frequency band.

Moreover, the frequency detection unit 308 supplies a DLL enable signal based on the detected frequency, and controls the operation of the DLL circuit 302. For example, the frequency detection unit 308 operates the DLL circuit 302 when the detected frequency is out of the range of the predetermined frequency band.

The selector 306 acquires the select signal from the frequency detection unit 308, and selects any of the internal clock generated by the DLL circuit 302 and the external clock received by the clock input buffer 300 based on the select signal. Then, the selector 306 outputs the selected one of the internal and external clocks as an operation clock of the graphic memory 110 to the memory logic circuit unit 202.

As described above, the graphic memory 110 is operated in the high frequency band by use of the DLL circuit 302 in the case of realizing the high performance of the graphic memory 110, and the graphic memory 110 is operated in the low frequency band without using the DLL circuit 302 in the case of reducing the power consumption of the graphic memory 110. Furthermore, the power saving of the graphic memory 110 can be realized by stopping the operation of the DLL circuit 302 when the graphic memory 110 is operated by use of the external clock.

Figure 5:
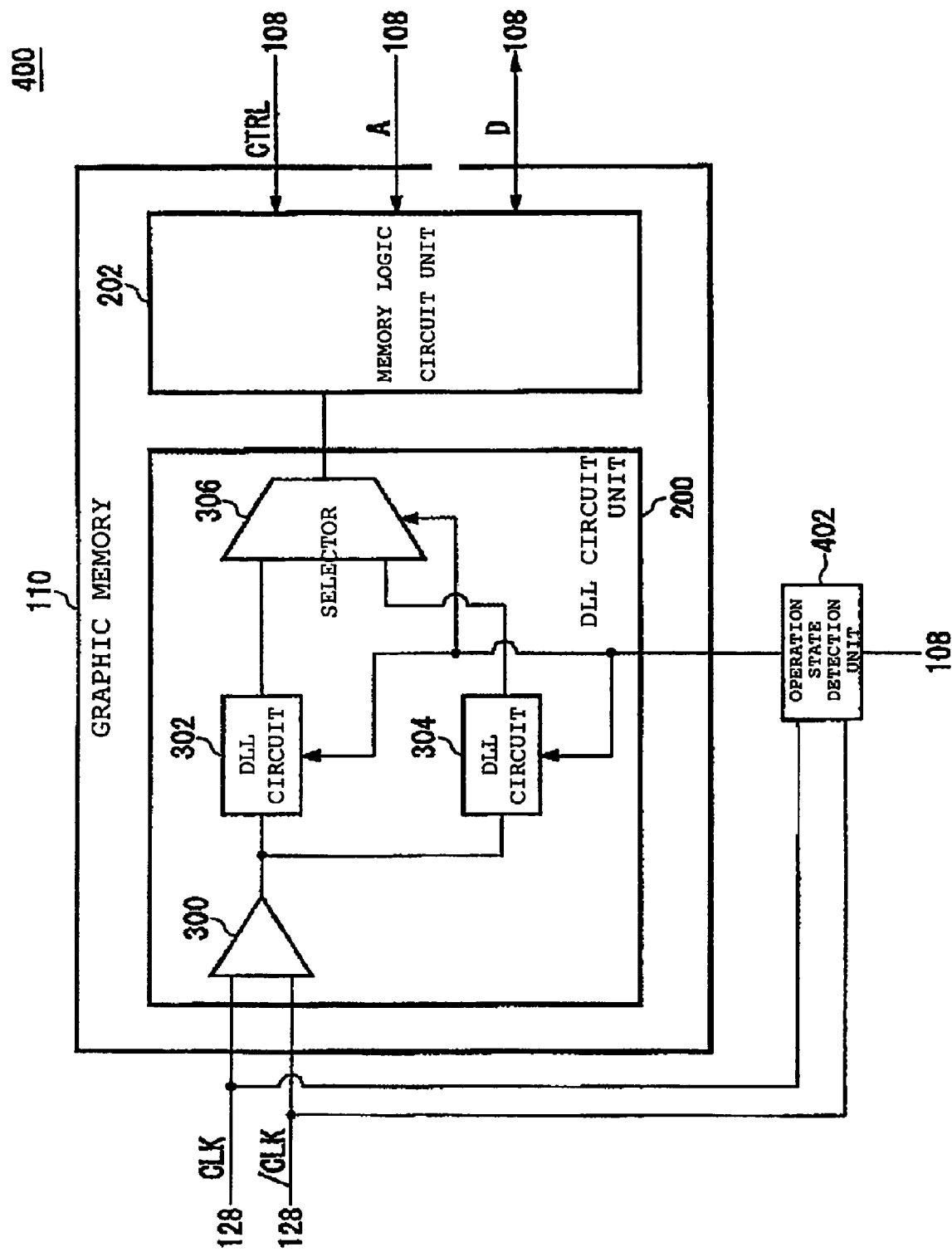
FIG. 5 is a diagram illustrating an example of a configuration of an information processing apparatus 400 according to a second embodiment.

FIG. 5 shows an example of a configuration of an information processing apparatus 400 according to a second embodiment of the present invention. Note that the configuration and function of the information processing apparatus 400 according to the second embodiment are the same as the configuration and function of the information processing apparatus 100 according to the first embodiment except a portion described below, and accordingly, description thereof will be omitted.

The information processing apparatus 400 according to this embodiment includes an operation state detection unit 402 for detecting an operation state of the graphic controller 108. The DLL circuit 302 is operated based on the external clock in the first frequency band, and generates the first internal clock from the external clock in the first frequency band. Meanwhile, the DLL circuit 304 is operated based on the external clock in the second frequency band lower than the first frequency band, and generates the second internal clock from the second frequency band.

The operation state detection unit 402 allows the selector 306 to select any of the first internal clock generated by the DLL circuit 302 and the second internal clock generated by the DLL circuit 304 based on the detected operation state of the graphic controller 108. Moreover, the operation state detection unit 402 supplies the DLL enable signal to the DLL circuits 302 and 304 based on the detected operation state of the graphic controller 108, and then operates one of the DLL circuits 302 and 304 and stops the other.

For example, the operation state detection unit 402 detects whether or not the graphic controller 108 is in an idle state. Here, the idle state of the graphic controller 108 indicates, for example, a state where the graphic controller 108 is not updating an image displayed on the display device 112, that is, a state where the graphic controller 108 is not writing data to the graphic memory 110.

When it is detected that the graphic controller 108 is not in the idle state, the operation state detection unit 402 allows the selector 306 to select the first internal clock generated by the DLL circuit 302. Then, the operation state detection unit 402 stops the operation of the DLL circuit 304. Specifically, the graphic memory 110 is operated at a high frequency when the graphic controller 108 is not in the idle state, and therefore, the DLL circuit 302 in which the operation frequency band is high is used.

Meanwhile, when it is detected that the graphic controller 108 is in the idle state, the operation state detection unit 402 allows the selector 306 to select the second internal clock generated by the DLL circuit 304. Then, the operation state detection unit 402 stops the operation of the DLL circuit 302. Specifically, the graphic memory 110 is operated at a low frequency when the graphic controller 108 is in the idle state, and therefore, the DLL circuit 304 in which the operation frequency band is low is used.

Furthermore, the operation state detection unit 402 may monitor a frequency of accesses of the graphic controller 108 to the graphic memory 110. Then, the operation state detection unit 402 allows the selector 306 to select any of the first internal clock generated by the DLL circuit 302 and the second internal clock generated by the DLL circuit 304 in response to the frequency of the accesses of the graphic controller 108 to the graphic memory 110. For example, when the frequency of the accesses of the graphic controller 108 to the graphic memory 110 is higher than a preset value, the operation state detection unit 402 allows the selector 306 to select the first internal clock generated by the DLL circuit 302, and stops the operation of the DLL circuit 304. Meanwhile, when the frequency of the accesses of the graphic controller 108 to the graphic memory 110 is lower than the preset value, the operation state detection unit 402 allows the selector 306 to select the second internal clock generated by the DLL circuit 304, and stops the operation of the DLL circuit 302.

In another example, the operation state detection unit 402 may have the same function as that of the frequency detection unit 308 according to the first embodiment, which is shown in FIG. 3. In the outside of the graphic memory 110, the operation state detection unit 402 may detect the frequency of the external clock supplied from the system clock generation circuit 128 to the graphic memory 110, and may control the DLL circuits 302 and 304 and the selector 306, which are included in the graphic memory 110. Note that the function of the operation state detection unit 402 according to this embodiment may be realized by any of hardware and software.

As described above, in accordance with the operation state of the graphic controller 108, the graphic memory 110 is operated in the high frequency band by use of the DLL circuit 302 when the high performance of the graphic controller 108 is required, and the graphic memory 110 is operated in the low frequency band by use of the DLL circuit 304 when the high performance of the graphic controller 108 is not required. Moreover, the operation of the DLL circuit that is not used is stopped, and thus the high performance of the graphic memory 110 and the extension of the operation time of the information processing apparatus 400 such as the notebook type personal computer by the battery can be made compatible with each other.

Although the present invention has been described above by use of the embodiments, the technical scope of the present invention is not limited to the scope described in the foregoing embodiments. A variety of alterations or improvements can be added to the foregoing embodiments. It is obvious from the scope of claims that an aspect added with such alterations or improvements can also be incorporated in the technical scope of the present invention.

According to the embodiments described above, information processing apparatus and memory modules, which are presented in the respective items below, are realized.

As evident from the above description, according to the present invention, the information processing apparatus and the memory module, which makes the high performance and the power saving compatible with each other, can be provided.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
   a system clock generator which produces a system clock; and a memory module which is coupled to said system clock generator and which produces an internal operation clock for use within the memory module, the internal operation clock being synchronized with an external clock present at an external clock input of the memory module, wherein the system clock is supplied to the external clock input of the memory module and wherein the memory module includes:
   a first DLL circuit which generates a first internal clock from an external clock in a first frequency band;
   a second DLL circuit which generates a second internal clock from an external clock in a second frequency band different from the first frequency band; and
   a selector which selects any of the first internal clock generated by the first DLL circuit and the second internal clock generated by the second DLL circuit, and outputs the selected clock as the internal operation clock for the memory module; and wherein
   a graphic controller which is coupled to said memory module and which controls draw processing of an image displayed on a display device through use of said memory module as a graphic memory; and wherein
   an operation state detector which detects an operation state of said graphic controller, and allows the selector to select the second internal clock generated by the second DLL circuit operated based on the external clock in the second frequency band lower than the first frequency band when the graphic controller is in an idle state; and wherein
   the operation state detector stops an operation of the first DLL circuit when the graphic controller is in the idle state.

2. Apparatus according to claim 1 wherein the operation state detector allows the selector to select the second internal clock generated by the second DLL circuit when the graphic controller does not update the image displayed on the display device.

3. Apparatus according to claim 1 wherein the operation state detector monitors an access frequency of the graphic controller to said memory module, and allows the selector to select any of the first internal clock generated by the first DLL circuit and the second internal clock generated by the second DLL circuit in accordance with the access frequency.

4. Apparatus comprising:
   a system clock generator which produces a system clock; and
   a memory module which is coupled to said system clock generator and which produces an internal operation clock for use within the memory module, the internal operation clock being synchronized with an external clock present at an external clock input of the memory module, wherein the system clock is supplied to the external clock input of the memory module and wherein the memory module includes:

a first DLL circuit which generates a first internal clock from an external clock in a first frequency band;

a second DLL circuit which generates a second internal clock from an external clock in a second frequency band different from the first frequency band; and a selector which selects any of the first internal clock generated by the first DLL circuit and the second internal clock generated by the second DLL circuit, and outputs the selected clock as the internal operation clock for the memory module; and a frequency detector which detects a frequency of the system clock supplied to the memory module and allows the selector to select the first internal clock generated by the first DLL circuit when the detected frequency is within a range of the first frequency band, and allows the selector to select the second internal clock generated by the second DLL circuit when the detected frequency is within a range of the second frequency band.

5. Apparatus comprising:

a memory module which generates an internal operation clock synchronized to an external clock, the memory module being operated based on the internal operation clock; wherein said memory module includes:

a first DLL circuit which generates a first internal clock from an external clock in a first frequency band;

a second DLL circuit which generates a second internal clock from an external clock in a second frequency band different from the first frequency band; and a selector which selects any of the first internal clock generated by the first DLL circuit and the second internal clock generated by the second DLL circuit, and outputs the selected clock as the internal operation clock of said memory module; and a frequency detector which detects a frequency of any of the external clocks and which allows the selector to select the first internal clock generated by the first DLL circuit when the detected frequency is within a range of the first frequency band and which allows the selector to select the second internal clock generated by the second DLL circuit when the detected frequency is within a range of the second frequency band.

6. Apparatus comprising:

a memory module which generates an internal operation clock synchronized to an external clock, the memory module being operated based on the internal operation clock; wherein said memory module includes:

a first DLL circuit which generates a first internal clock from an external clock in a first frequency band;

a second DLL circuit which generates a second internal clock from an external clock in a second frequency band different from the first frequency band; and a selector which selects any of the first internal clock generated by the first DLL circuit and the second internal clock generated by the second DLL circuit, and outputs the selected clock as the internal operation clock of said memory module; and wherein a frequency detector which detects a frequency of any of the external clocks and which stops an operation of the second DLL circuit when the detected frequency is within the range of the first frequency band and which stops an operation of the first DLL circuit when the detected frequency is within the range of the second frequency band.

7. Apparatus comprising: a system clock generator which produces a system clock; and a memory module which is coupled to said system clock generator and which produces an internal clock synchronized to an external clock present at an external clock input of the memory module, wherein the system clock is supplied to the external clock input of the memory module and wherein the memory module includes: a DLL circuit which generates the internal clock from the external clock in a predetermined frequency band; a selector which selects any of the internal clock generated by the DLL circuit and the external clock, and outputs the selected clock as the operation clock of the memory module; and a frequency detector which detects a frequency of the external clock and which allows the selector to select the internal clock when the detected frequency is within a range of the predetermined frequency band and which allows the selector to select the external clock when the detected frequency is out of the range of the predetermined frequency band.

8. Apparatus comprising: a memory module which generates an internal clock which is synchronized to an external clock; wherein said memory module includes: a DLL circuit which generates the internal clock from the external clock in a predetermined frequency band; a selector which selects any of the internal clock generated by the DLL circuit and the external clock and which outputs the selected clock as the operating clock of the memory module; and a frequency detector which detects a frequency of the external clock and which allows the selector to select the internal clock when the detected frequency is within a range of the predetermined frequency band and which allows the selector to select the external clock when the detected frequency is out of the range of the predetermined frequency band.

9. Apparatus according to claim 8 wherein the frequency detector stops an operation of the DLL circuit when the detected frequency is out of the range of the predetermined frequency band.

* * * * *